Aug. 24, 1943.                W. P. HERMAN                2,327,891
                                TURN KNOB
                          Filed Jan. 26, 1942        2 Sheets-Sheet 1

INVENTOR
William P. Herman
BY Nathaniel Frucht
ATTORNEY

Aug. 24, 1943.    W. P. HERMAN    2,327,891
TURN KNOB
Filed Jan. 26, 1942    2 Sheets-Sheet 2
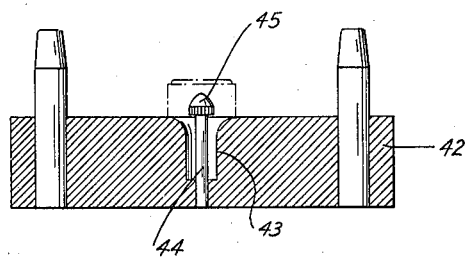
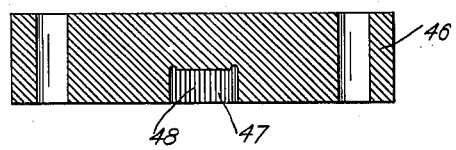
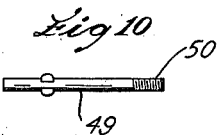
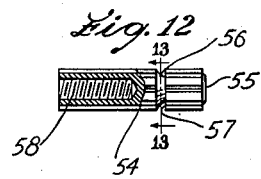
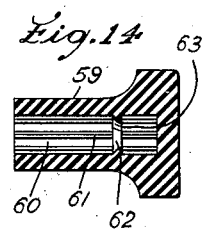
INVENTOR
William P. Herman
BY Nathaniel Frucht
ATTORNEY Patented Aug. 24, 1943

2,327,891

UNITED STATES PATENT OFFICE 2,327,891

TURN KNOB

William P. Herman, Providence, R. I.

Application January 26, 1942, Serial No. 428,329

5 Claims. (Cl. 287—53)

My present invention relates to a method and means for connecting a soft rubber part to an associated, complementary or cooperating part, object or the like.

More particularly, my present invention is directed to turn knobs and similar articles for electrical devices, and to a novel method of manufacture of the same.

The principal object of the present invention is to provide a turn knob which can be readily molded in an integral piece from soft rubber.

Another object of the present invention is to provide a novel, economical and simple construction for assembling and locking a soft rubber turn knob to a mandrel or shaft of an electrical device.

A further object is to provide a soft rubber turn knob which can be locked to an electrical device without set screws or similar locking means and which does not require molding of the knob on the mandrel or shaft.

Another object of the invention contemplates the provision of a method for assembling turn knobs with electrical devices which simplifies the assembly and eliminates the necessity of direct molding, adhesives, set screws, or special assembling operations and equipment.

With the above and other objects and advantageous features in view, my invention consists of a novel arrangement of parts and a novel method of manufacture and assembly, more fully disclosed in the detailed description following, in conjunction with the accompanying drawings, and more specifically defined in the claims appended thereto.

In the drawings:

Fig. 8 is a section of a lower die element;

Fig. 9 is a section of an upper die element;

Fig. 10 is a side elevation of another form of mandrel;

Fig. 11 is a side elevation of the insert for the mandrel shown in Fig. 10;

Fig. 12 is a side elevation of a preferred form of mandrel insert;

Fig. 13 is a section taken on line 13—13 of Fig. 12; and

Fig. 14 is a sectional view of a preferred turn knob for the mandrel insert shown in Figs. 12 and 13.

Figure 1:
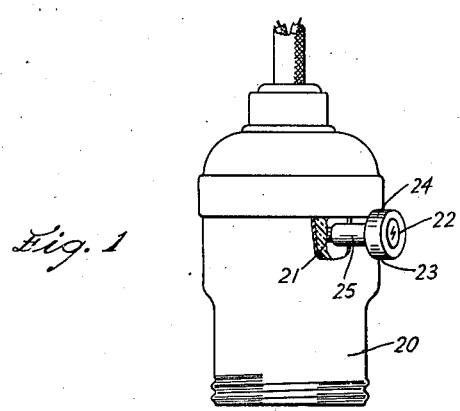
Fig. 1 is an elevation of a bulb socket embodying my invention.

In the construction of electrical devices such as lamps, sockets, radios, dials, rotary switches, etc., the manually engageable turn knobs have heretofore been molded from hard rubber, phenol condensation products, shellac, or other plastics. These products are subject to chipping or breaking and also deteriorate in electrical insulation and heat resisting qualities. Each knob also presents a problem of assembly which adds materially to the cost of the device. For example, where it is preferable to permanently attach the knob to the mandrel or shaft, the end of the mandrel is split and fish-tailed and the knob is molded directly onto the mandrel. This requires the mandrel to be centered and held in the mold during the molding operation, thus adding to the time and cost of molding.

For other constructions it is impossible to mold the device with the knob and the knob must be put on after assembly. In such cases the end of the shaft or mandrel is threaded and a complementary threaded insert is molded into the knob. This presents the same molding and manufacturing difficulties as in the previous form and also requires threading and additional pieces which add to the expense. Furthermore, many switches operate in both directions; since a threaded turn knob can only be turned in one direction, additional lock devices must be used.

These and many other disadvantages are inherent in this type of construction. The present invention is designed to overcome these difficulties, to lessen the cost of manufacture and assembly, to simplify molding, to eliminate threading, set screws and the like, and to provide a product which is unbreakable and which has improved dielectric properties.

In the method of the present invention, the turn knob is not molded onto the mandrel, but is premolded in an integral piece from soft rubber. The mold is especially designed to provide the turn knob with interlock portions which cooperate with the novel mandrel ends to lock the turn knob on the mandrel by the simple method of manually pushing the knob onto the mandrel after the device (with the mandrel) has already been assembled. This saves considerable assembly and manufacturing costs besides providing the device with a non-breakable soft rubber knob.

In the drawings, the interlocking means are shown as providing shoulder portions of various types. It is to be understood, however, that the invention is not limited to the particular form of interlock as equivalent types, such as struck-up lugs, tines, etc., will be readily apparent to a person skilled in the art.

Referring more in detail to the drawings, I provide a turn knob which is integrally molded from soft rubber and has a novel type of locking arrangement greatly facilitating its assembly. For purposes of illustration I have shown my invention as applied to a turn knob for a bulb socket. For example, the conventional bulb socket 20 is provided with a mandrel 21 for operating the switch (not shown), which may be operated by turning the mandrel clockwise or in both directions. Locked to the end of the mandrel 21 is the novel turn knob 22 which is preferably molded from soft rubber in a single integral piece. The knob 22 comprises a manually engageable head portion 23, which may be knurled if desired, as at 24, and an integral shank portion 25 which may be of any desired length, the shank portion 25 covering as much of the exposed portion of the mandrel 21 as extends from the socket 20.

Figure 2:
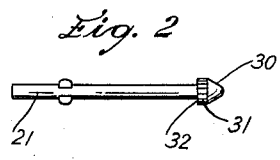
Fig. 2 is a side elevation of the mandrel.
Figure 3:
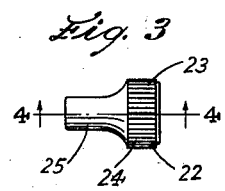
Fig. 3 is a side elevation of the turn knob.
Figure 4:
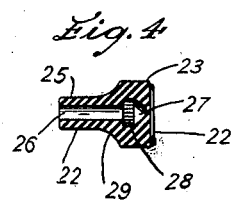
Fig. 4 is a section along line 4—4 on Fig. 3.

Referring to Figs. 3 and 4, the knob 22 is molded with a passageway 26 extending axially through the shank portion 25, the inner end of the passageway 26 extending partially into the head 23 and terminating in a recess 27. The recess 27 is preferably generally conical in shape with the lower portion 28 knurled and of greater diameter than the passageway 26, and forming an abrupt shoulder 29. The outer end of the mandrel 21 is stamped to provide a conical head 30, see Fig. 2, the lower portion 31 being knurled and providing a lock shoulder 32.

To assemble, the mandrel 21 is assembled with the socket 20 in the usual manner without the turn knob. The knob 22 is then pushed onto the mandrel 21, the passageway 26 expanding and passing over the conical head 30 and grippingly engaging the mandrel 21. The head 30 enters the recess 27, the knurled portions 28 and 31 and the shoulders 29 and 32 interlocking. The interlocked shoulders 29 and 32 permanently lock the knob to the mandrel and prevent withdrawal therefrom. The gripping action of the soft rubber and the interlocking knurling 28 and 31 lock the mandrel to turn in either direction on manual movement of the knob.

Figure 5:
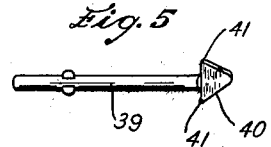
Fig. 5 is a perspective of another form of mandrel.
Figure 6:
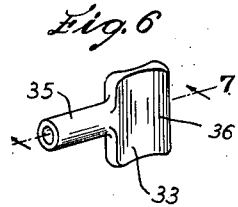
Fig. 6 is a perspective view of another form of turn knob for the mandrel shown in Fig. 5.
Figure 7:
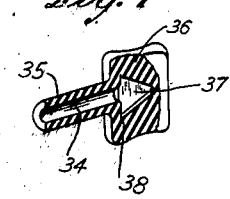
Fig. 7 is a section taken along line 7—7 on Fig. 6.

The above described turn knob eliminates set screws, inserts, threading or other types of locking means and is easy and simple to assemble, requiring merely a slight pressure to snap the knob on the mandrel. Furthermore, the mandrel head 30 serves as a stiffener for the knob and prevents the knob from collapsing, twisting, or bending under manual or other pressure, and the knob will not break or chip in use.

Where the turn knob is flat, a slightly modified construction, illustrated in Figs. 5, 6 and 7, may be used. In this construction, the knob 33 is molded with a passageway 34 extending axially through a shank portion 35, the inner end of the passageway 34 extending partially into the flat head portion 36 and terminating in a flat, arrow head shaped recess 37. The recess 37 is preferably generally triangular in shape with the lower corners 38 rounded.

The outer end of the mandrel 39 is stamped to provide an arrow head 40, see Fig. 5, the lower corners 41 being preferably sharp and hooking slightly rearwardly and forming lock shoulders.

To assemble, the knob 33 is pushed onto the mandrel 39, the passageway 34 extending and passing over the arrow head 40 and grippingly engaging the mandrel 39. The head 40 enters the recess 37 with the lower hooked corners 41 piercing the corners 38 of the recess to permanently lock the knob to the mandrel and to prevent withdrawal therefrom. The gripping action of the soft rubber and the cooperation of the flat recess and shoulders and the flat head and shoulders lock the mandrel to turn in either direction on manual movement of the knob, and the flattened mandrel end acts as a stiffener for the flat head of the knob to prevent bending.

To mold the turn knob of the present invention, a simple multiple mold of the type shown in Figs. 8 and 9 may be used. In this construction, the lower die element 42 is provided with cavities 43 shaped to form the shank portions of the knobs. Each cavity is provided with a core 44 imbedded in the die and having a head portion 45, the core 44 and the head 45 forming the shank passageways and lock recesses of the knob. The upper die element 46 is provided with cavities 47, which may be knurled as indicated at 48, to form the head of the knob. Inasmuch as the cores 44 are locked in the die, the molding operation becomes very simple and easy. It is obvious that the cavities and cores may be readily varied for different types of turn knob and mandrel constructions.

The use of a soft rubber knob affords much better insulation than the materials heretofore used and the novel construction permits the exposed surface of the mandrel to be completely insulated, thus eliminating all danger of shocks. Furthermore, the soft rubber knob will not chip, break or scratch.

Some devices require the turn knob to be removable. In such cases, the construction shown in Figs. 10 and 11 may be used, in which the mandrel 49 is provided with threads 50 at its outer end, and an insert 51 having internal threads 52 is used to threadedly engage the end of the mandrel. The outer end of the insert may be shaped into a conical head 53 similar to the head on the mandrel 21, and the knob is molded similarly to the knob 22, or the insert and knob may be in the other forms herein illustrated.

In assembly, the insert 51 is merely pushed into the knob to permanently lock it into place and the knob can then be screwed and unscrewed from the mandrel as desired. To facilitate the assembly, the insert may first be threaded to the mandrel and the knob snapped over it, if preferred.

A preferred form of knob and mandrel arrangement is illustrated in Figs. 12 to 14 inclusive. In this form the mandrel tip 54 is provided with spaced parallel grooves or knurlings 55 slightly deeper than conventional knurlings, and with an annular undercut 56 which is cut towards the end to form an abrupt shoulder 57. When used as an insert, the portion 54 is internally threaded, as at 58, and the mandrel itself is formed as in Fig. 10. With this type of mandrel insert, the knob 59 is molded as shown in Fig. 14, having a central axial passageway 60 with longitudinal grooves 61 complementary to the grooves 55 of the mandrel, and having an integral annular ring 62 with an abrupt shoulder 63.

It may be well to note at this point that in this and in the hereinabove described forms, the mold insert is identical with the mandrel tip so that the cavity in the knob will receive the mandrel tip with the same exact fit that prevails in the mold.

In assembly, the knob 59 is pushed onto the mandrel 54, the shoulders 57 and 63 interlocking to prevent withdrawal and the grooves or knurlings 55 and 61 interlocking for turning movement. This form is simple in construction, providing a straight mandrel without a head, is easy to manufacture and assemble, and permits more rubber in the head and a more even distribution of the stiffening effect of the mandrel. Furthermore, it can readily be used with any shape of turn knob and the mandrel can be easily formed from brass and does not require any stamping or drawing operations.

By the term "turn knob," as hereinbefore described, I mean any knob, key handle, button, or other device used to lockingly engage the end of a mandrel or shaft for turning movement. While the forms of turn knobs illustrated herein are shown and described as specifically applied to electrical devices, it is obvious that my invention can readily be adapted to other devices requiring turning movement of a shaft or mandrel.

The turn knobs heretofore described may be molded in different sizes and in varying outer shapes and the interlocking construction may be changed to suit requirements for different devices, without departing from the spirit and scope of the invention as defined in the appended claims.

I claim:

1. In a combination turn knob and mandrel, a turn knob comprising an integral one-piece body of resilient rubber having a manually engageable head portion and a shank portion integral therewith, said knob having a central axial passageway extending through the shank portion into the head portion, said head portion having a recess of greater diameter than said passageway and with abrupt shoulders, a mandrel adapted to receive said turn knob, said mandrel having an enlarged head adapted to nest within the knob recess and having abrupt shoulders adapted to interlock with said knob head shoulders to lock said knob on said mandrel.

2. A turn knob comprising an integral one-piece body of resilient rubber having a manually engageable head portion and a shank portion integral therewith, said knob having a central axial passageway extending through the shank portion into the head portion, said passageway terminating in said head portion in a central conical recess of greater diameter than the passageway and with abrupt shoulders, said head portion having deeply scored internal axial knurlings in said recess wall.

3. In a combination turn knob and mandrel, a turn knob comprising an integral one-piece body of resilient rubber having a manually engageable head portion and a shank portion integral therewith, said knob having a central axial passageway extending through the shank portion into the head portion, said head portion having a central conical recess of greater diameter than said passageway and with abrupt shoulders, a mandrel adapted to receive said turn knob, said mandrel having an enlarged conical head adapted to nest within the knob recess and having abrupt shoulders adapted to interlock with said knob head shoulders to lock said knob on said mandrel, said mandrel head forming a stiffener for said knob head.

4. In a combination turn knob and mandrel, a turn knob comprising an integral one-piece body of resilient rubber having a manually engageable head portion and a shank portion integral therewith, said knob having a central axial passageway extending through the shank portion into the head portion, said head portion having a recess of greater diameter than said passageway and with abrupt shoulders, said head having internal axial knurlings in said recess, a mandrel adapted to receive said turn knob, said mandrel having an enlarged head adapted to nest within the knob recess and with abrupt shoulders adapted to interlock with said knob shoulders, said head having knurlings adapted to mesh with said knob knurlings.

5. In a combination turn knob and mandrel, a turn knob comprising an integral one-piece body of resilient rubber having a manually engageable head portion and a shank portion integral therewith, said knob having a central axial passageway extending through the shank into the head portion, said head having a central conical recess of greater diameter than said passageway and with abrupt shoulders, said head having internal axial knurlings in said recess, a mandrel adapted to receive said turn knob, said mandrel having an enlarged conical head adapted to nest within the knob recess and with abrupt shoulders adapted to lock with said knob shoulders, said head having knurlings adapted to mesh with said knob knurlings, said mandrel head forming a stiffener for said knob head.

WILLIAM P. HERMAN.